United States Patent [19]

Krambeck et al.

[11] 3,831,041

[45] Aug. 20, 1974

[54] COMPENSATING CIRCUIT FOR SEMICONDUCTIVE APPARATUS

[75] Inventors: Robert Harold Krambeck, South Plainfield; Robert Joseph Strain, Plainfield, both of N.J.

[73] Assignee: Bell Telephone Laboratories, Incorporated, Murray Hill, N.J.

[22] Filed: May 3, 1973

[21] Appl. No.: 356,958

[52] U.S. Cl. .............. 307/304, 307/221 D, 307/246, 307/297, 323/4

[51] Int. Cl. .............. H03k 1/14, H03k 3/33

[58] Field of Search .............. 307/202, 279, 246, 296, 307/297, 251, 304, 221 C, 221 D, 224 C; 323/1, 3, 4, 7, 8, 16, 22 R

[56] References Cited

UNITED STATES PATENTS

| | | | |
|---|---|---|---|
| 3,521,087 | 7/1970 | Lombardi | 307/204 X |
| 3,657,575 | 4/1972 | Taniguchi et al. | 307/251 X |
| 3,700,934 | 10/1972 | Swain | 323/4 X |
| 3,737,683 | 6/1973 | Sangster | 307/304 X |

*Primary Examiner*—Rudolph V. Rolinec
*Assistant Examiner*—L. N. Anagnos
*Attorney, Agent, or Firm*—A. J. Torsiglieri

[57] ABSTRACT

A number of compensating circuits each of which provides an output voltage which differs from an applied input voltage by one or more IGFET threshold voltages. Each circuit typically includes a main IGFET, a load IGFET and one or more bias control IGFETS in the gate branch of either the active or load transistor. Specific compensating circuits adapted for use in the regenerator of a charge transfer device and in a constant current generator are disclosed.

8 Claims, 4 Drawing Figures

COMPENSATING CIRCUIT FOR SEMICONDUCTIVE APPARATUS

BACKGROUND OF THE INVENTION

This invention relates to semiconductive apparatus.

In the manufacture of semiconductive apparatus, it is generally desirable to reduce the influence of variations in the semiconductive chips from which the devices are made. The problem is particularly important in some forms of complex integrated circuits where there is required at some point a reference voltage which advantageously has a prescribed relationship to other operating voltages in the circuit. In particular, it may be advantageous to have available a voltage which differs from an externally applied voltage by a number of threshold voltages characteristic of IGFETs in the circuit.

As one particular example of this need, in one aspect the invention will be specifically described in the context of a charge transfer device (CTD). Such devices are becoming of increasing importance as shift registers, delay lines and imaging devices. Such devices typically include a storage medium comprising a succession of localized storage sites in each of which there may be stored for a finite time a charge packet corresponding to one sample of a data stream forming signal information. Provision is made in shift register fashion, for the selective introduction in turn of each of a series of charge packets at the first site of the succession, the subsequent transfer to succeeding sites under the control of clock pulses, and ultimately the detection in turn of each of the charge packets at the end of the succession. In such a device involving a large number of transfers, it is advantageous to provide periodic detection and regeneration of the data stream at intermediate points of the succession to minimize signal degradation.

Examples of CTDs including suitable detectors and regenerators are described in copending U.S. applications Ser. Nos. 114,624; 114,625; and 337,669, filed Feb. 11, 1971, Feb. 11, 1971, and Mar. 2, 1973, respectively, all assigned to the same assignee as this application. It is characteristic of such detectors and regenerators that there is involved a reference voltage with which a charge packet signal is compared, typically to distinguish between two logic states, e.g., a "one" or a "zero." At its point of application, the effective reference voltage normally is affected by variability of two threshold voltages which are dependent on the parameters of the semiconductive chip in which the charge transfer device is built. Such parameters may vary from chip to chip and result in a variation of the effective value of the operative threshold for distinguishing between ones and zeros. In one aspect, the invention is a circuit for providing a suitably compensated voltage for use in such detection and regeneration.

In another aspect, the invention relates to a constant current source in which an insulated-gate-field-effect transistor operated in the saturation region is provided with a circuit for appropriate compensation of its externally supplied voltage whereby the dependence of its output current on its threshold voltage is substantially eliminated.

SUMMARY OF THE INVENTION

In its general form, a compensating circuit in accordance with the invention involves a first terminal where an externally supplied votage is supplied for compensation, a second terminal where the compensated voltage is to be derived, and a third terminal which is to be operated at a reference potential, and includes a first IGFET transistor, to be termed the main transistor, which is connected by its source and drain between the first two terminals, a second IGFET connected by its source and drain between the last two terminals, to be termed the load transistor, and one or more bias control IGFETs connected in the gate branch of either or both of the main and load transistors.

In one specific embodiment of particular interest for use in the regenerator of the March 1973 application previously identified, there are included two bias control transistors in the gate branch of the main transistor and none in the gate branch of the load transistor.

In another compensating circuit for use with the same regenerator, there is included only one bias control transistor in the gate branch of the main transistor but there are included a pair of serially connected load transistors.

In a compensating circuit intended for use in a constant current source, no bias control transistor is included in the gate branch of the main transistor but two are connected in the gate branch of the load transistor.

By these examples, it should be clear that the invention has a wide range of applications.

In particular, by circuits of these kinds there is made available an output voltage which differs from an applied voltage by a voltage which can be related in a desired manner to the threshold voltages of the main load, and bias control transistors. This makes it feasible to derive an output voltage for use at a particular point in a complex circuit which has been compensated by voltages which will be characteristic of the parameters of the chip in which the compensating circuit is made. Most advantageously, by including the compensating circuit in monolithic form in the same chip as the remainder of the circuit, the overall circuit may be made relatively independent of the parameters of the chip and in this way the influence of chip-to-chip variations on the properties of the complex circuit can be reduced.

DRAWING DESCRIPTION

The invention will be better understood from the following more detailed description in conjunction with the accompanying drawing, in which:

FIG. 1 shows schematically a general form of a compensating circuit in accordance with the invention for discussion purposes;

FIGS. 2 and 3 each show schematically a specific circuit of the general type shown in FIG. 1 for use in a charge transfer device of the kind described in the March 1973 application previously identified; and FIG. 4 shows a constant current source including a specific compensating circuit of the kind shown in FIG. 1.

DETAILED DESCRIPTION

Figure 1:
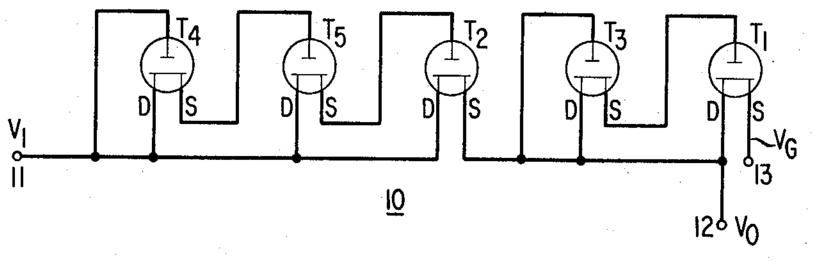

With reference now to FIG. 1, there is shown a general form compensating circuit 10 connected between an input terminal 11 to which is applied an input voltage $V_1$ to be compensated and an output terminal 12 where there is derived the compensated output voltage $V_o$ useful as an operating voltage at some other point of the apparatus. The circuit comprises a pair of insulated-gate-field-effect transistors $T_1$ and $T_2$ serially connected between the input terminal 11 and a point 13 of reference potential, advantageously ground. In particular, the input terminal is connected to the drain of $T_2$ whose source is connected to the drain of $T_1$ whose source is connected to ground, and the output terminal 12 corresponds to the node between the source of $T_2$ and the drain of $T_1$. Since the discussion will treat the case where all the transistors employ a p-type channel, this corresponds to an input voltage negative with respect to ground. Of course, n-type channel transistors may be employed with appropriate polarity changes.

Additionally, a number, depending on how many threshold voltages are to be compensated, of bias control transistors are included in the gate branches of $T_1$ and $T_2$. As shown, one transistor $T_3$ is included in the gate branch of $T_1$ and two transistors $T_4$ and $T_5$ in the gate branch of $T_2$. $T_3$ has its gate and drain each connected to the drain of $T_1$ and its source to the gate of $T_1$, $T_4$ has its source connected to the gate of $T_5$ and its gate and drain to the drain of $T_2$, and $T_5$ has its drain connected to the drain of $T_2$, and its source to the gate of $T_2$.

It will be convenient to characterize $T_2$ as the main transistor since it is in the main current path between the input terminal 11 and the output terminal 12. $T_4$ and $T_5$ serve primarily to control the gate bias on $T_2$, and will be termed control bias transistors. It will be convenient to characterize $T_1$ as the load transistor since it forms a path in shunt with the useful load that will be supplied by output terminal 12. $T_3$ serves primarily to control the gate bias on $T_1$, and also will be termed a control bias transistor.

In analyzing this cicuit, it will be convenient to assume that $V_T$, the characteristic threshold voltage for turning the transistor "on", is the same for all the transistors included in the chip. This is a reasonable assumption where the insulating layer associated with the gate and the doping in the gate channel are essentially uniform over the chip or at least for each of the relevant transistors in the chip.

The assumption of uniform threshold voltages is used primarily to simplify the detailed description of the invention; this assumption is by no means restrictive, and in describing other embodiments, specific note will be given to using IGFETs with threshold voltages which are intentionally different, to effect a precise compensation for variations in a particular circuit.

In analyzing the generalized circuit, let Z be the width of an IGFET channel and L its length, $\mu$ the hole mobility and C the gate insulating layer capacitance per unit area. It will be helpful to define $\beta$ as equal to Z/L $\mu$ C for $T_2$ and $\alpha^2$ as the ratio of Z/L for $T_1$ to $T_2$.

With no output current at 12, the same current flows in $T_1$ and $T_2$. Assuming saturation, the normal operating condition, it can be shown that the output voltage $V_o$ when no current flows is given by $$V_o = V_1 + \alpha V_G/1 + \alpha + (V_T/1+\alpha)\ [\alpha(n+1) - (m+1)]$$

where $V_1$, $V_o$, and $V_G$ are the voltages shown in FIG. 1, and $m$ is the number of bias control transistors in the gate branch of $T_2$ (2 in the circuit shown) and $n$ is the number of bias control transistors in the gate branch of $T_1$ (1 in the circuit shown). In particular, it can be seen that $V_o$ will differ from the applied voltage $V_1$ by some multiple of $V_T$, the threshold voltage of the transistors.

It can further be shown that as current is drawn the change in $\Delta V$ is approximately given by $$\Delta V = I_o/[-\beta\ \alpha\ (1+\alpha)\ (V_o - V_G - (n+1)\ V_T)] \qquad 2.$$

where $I_o$ is the current being drawn. For typical operating values, the change in output voltage will be relatively independent of the current being drawn, attesting to the good voltage regulation.

In the regenerator included in the charge transfer device described in the March 1973 application previously mentioned, there is need for an output voltage which differs from a clock voltage $V_C$ in the following manner:

$$V_o = V_C - 2\ V_T + 3/4\ V_B \qquad 3.$$

where $V_T$ is, as before, the threshold voltage associated with a transistor involved in the regenerator and $V_B$ is the change in barrier height introduced by an ion implant in a particular region of the charge transfer device. Inasmuch as it is unnecessary to understand the details of the charge transfer device and/or the regenerator included therein, a description of this device will not be included here. For a detailed description thereof, reference is made to that application.

It can be seen that if one chooses $\alpha = 1/3$, $V_G = 0$, $n = 0$, $m = 2$, equation (1) would become $$V_o = 3/4\ V_1 - 2\ V_T$$

if $V_T$ was the same for all the transistors. For reasons unimportant to the present invention, in this regenerator there is involved an ion implanted region which modifies the assumption that $V_T$ is uniform. Accordingly, a correction factor is advantageously introduced so that instead the following relationship applies $$V_o = 3/4\ V_1 - 2\ V_T + 3/4\ V_B$$

where $V_B$ is the barrier height change resulting in the implanted region.

If $V_1$ is chosen to be 4/3 $V_C$, this is exactly the compensation required.

Figure 2:
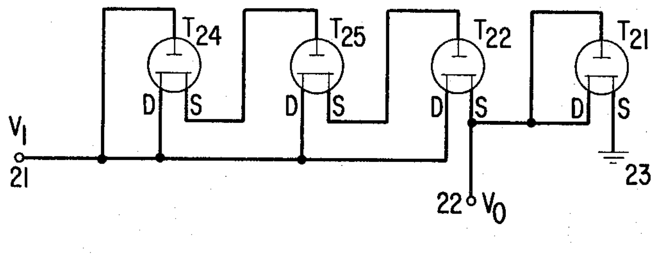

In FIG. 2, there is shown a circuit suitable for providing the desired compensation, corresponding to an $m = 2$, $n = 0$ and $\alpha = 1/3$.

In particular, this circuit comprises an input terminal 21 to which would be applied an input voltage $V_1$ corresponding to 4/3 $V_C$ and an output terminal 22 where there is derived an output voltage $V_o$ equal to $V_C - 2\ V_T + 3/4\ V_B$.

The circuit further includes $T_{21}$ whose source is connected to a point 23 of reference or ground potential and its gate and drain to terminal 22, and $T_{22}$ which has its source connected to terminal 22, its drain to terminal 21. The gate of $T_{22}$ is connected to the source of $T_{25}$ whose gate is connected to the source of $T_{24}$ and whose drain is connected to terminal 21. To complete the circuit, the drain and gate of $T_{24}$ are also connected to terminal 21. Comparing the circuits of FIGS. 1 and 2, $T_1$ corresponds in role to $T_{21}$, $T_2$ to $T_{22}$, $T_4$ to $T_{24}$, and $T_5$ to $T_{25}$. The ratio of Z/L for $T_{21}$ is made 1/9 that for $T_{22}$ to provide an $\alpha = 1/3$. Moreover, to introduce the 3/4 $V_B$ correction, the channel region associated with $T_{24}$ is implanted to modify its threshold voltage by an amount equal to $V_B$.

In this circuit, $T_{21}$ provides compensation of $1/4\ V_T$ while $T_{22}$, $T_{24}$, and $T_{25}$ provide $(-9/4\ V_T + 3/4\ V_B)$ correction.

It is, of course, feasible to utilize alternative arrangements to achieve satisfactory compensation. In particular, a circuit of reduced current requirements can be achieved by modifying the gate branch of the load transistor to relieve it of its role in compensation and to confine its role simply to the provision of current to the output node. In particular, it will be characteristic of regenerators for use in charge transfer devices that the current needs will be directly related to the frequency of the clock voltages used to control the transfer of charge between successive sites. If it is important to draw no more current than necessary, it is desirable to have a compensating circuit which supplies current which varies directly with the clock frequency.

Figure 3:
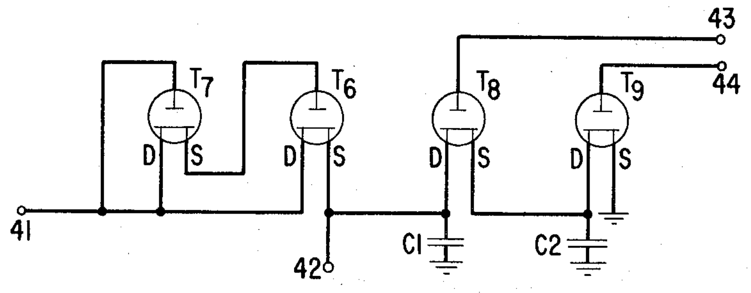

FIG. 3 shows an arrangement of this kind. It includes an input terminal 41 and an output terminal 42 with the main transistor $T_6$ and its bias control transistor $T_7$ connected therebetween. It will be apparent that when the current in $T_6$ is very small at the output terminal, the output voltage $$V_o = V_1 - V_{T6} - V_{T7}$$

where $V_{T6}$ and $V_{T7}$ are the threshold voltages of $T_6$ and $T_7$.

It is also important to insure that sufficient current will be available at the output terminal. As shown, the capacitors $C_1$ and $C_2$ and the transistors $T_8$ and $T_9$ serve this purpose. $T_8$ is connected to have its drain connected to the output terminal 42 and its source to the drain of $T_9$. $T_9$ has its source connected to ground and its drain connected to one side of capacitor $C_2$, the other side of which is connected to ground. $C_1$ is connected between the drain of $T_8$ and ground. The gates of each of $T_8$ and $T_9$ are connected to different clock lines $V_{C1}$ and $V_{C2}$ which supply voltages of sign and magnitude to cause $T_8$ and $T_9$ alternately to conduct in synchronism with the clock frequency.

In this circuit, $C_1$ serves to store charge and to meter it out as needed by the compensating circuit while $T_8$ and $T_9$ and $C_2$ serve as a current source for periodically replenishing the charge on $C_1$ as needed. In particular, during the clock interval when $T_9$ is turned on, and $T_8$ is turned off, the voltage across $C_2$ will drop to zero. In the successive half cycle when $T_9$ is off and $T_8$ on, charge will flow from node 42 until $C_2$ is charged to $V_o$. This charge transfer amounts to $V_o$ times $C_2$ and it occurs every clock cycle, supplying a current to node 42 directly proportional to the clock frequency.

It is possible to achieve some circuit simplification if it is not desired to provide a curremt source independent of the clock frequency. In such an instance, $T_9$ and $C_2$ may be eliminated and the source of $T_8$ connected to ground and its gate connected to a suitable voltage source adequate to turn $T_8$ on at least peirodically to keep replenished the charge on $C_1$.

Moreover, with the elimination of $T_9$ and $C_2$, other circuit modifications become feasible. In particular, it is possible to connect the gate of $T_8$ to its drain and the source either to ground or a separate voltage source.

Moreover, in the case where normally on the average more than the required charge will be delivered to terminal 42 from the load and capacitor C1 is able to replenish itself so that it can meter out current when it is needed, no further source of current may be required and even $T_8$ can be eliminated.

In this circuit, $C_1$, which normally will be of relatively large capacitance, can be formed either in the same monolithic chip as the remainder of the circuit or as a separate discrete element.

As an example of the use of a compensating circuit in a different role, such a circuit finds use in a constant current generator utilizing an IGFET.

As is well known, the current-voltage characteristic of a typical insulated-gate transistor has a region called the saturation region where the drain current is nearly independent of the drain-to-source voltage but strongly dependent on the threshold voltage especially if the difference between the externally supplied voltage applied to the gate $V_G$ and the threshold voltage $V_T$ is small compared to $V_T$.

This dependence of the drain current can be substantially eliminated by appropriate compensation of the externally supplied voltage. This should make it possible to reduce substantially the chip-to-chip variations in output current.

To achieve proper compensation, $V_o$ which is to be applied to the gate of the constant current source transistor should be $V_T$ more than some voltage which may be conveniently supplied to the compensating circuit as the input voltage $V_1$. Therefore, with reference to equation (1) this can be achieved when $$[\alpha\,(n+1) - (m+1)]/1 + \alpha = 1$$

or $$\alpha\, n - m = 2.$$

There are many combinations of $\alpha$, $n$ and $m$ which can be chosen to satisfy this relationship. A set which employs relatively few components and a minimum area is realized when $\alpha = 1$, $n = 2$, and $m = 0$. A circuit corresponding to these values is shown in FIG. 3 combined in the same chip with a constant current transistor to serve as a constant current source.

Figure 4:
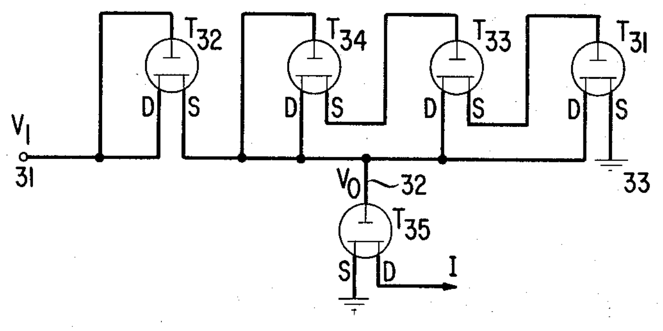

In the integrated circuit of FIG. 4, the compensating circuit comprises a main transistor $T_{32}$ having its drain and gate terminals connected to the input terminal 31, where there is applied an externally supplied voltage $V_1$, and its source connected to the terminal 32 where there is derived the compensated voltage. Since this corresponds to a circuit in which $m = 0$, there is no control bias transistor in the gate branch of $T_{32}$.

The terminal 32 is connected to the gate of $T_{35}$ which is the constant current source transistor having its source connected to ground 33 and its drain to the circuit being supplied with the constant current I.

The circuit further includes the load transistor $T_{31}$ having its source connected to ground and its drain to terminal 32. Corresponding to the case of $n = 2$, control bias transistors $T_{33}$ and $T_{34}$ are connected in the gate branch of $T_{31}$. To this end, the gate of $T_{31}$ is connected to the source of $T_{33}$ whose drain is connected to terminal 32 and whose gate is connected to the source of $T_{34}$ whose gate and drain are connected to terminal 32.

In operation, there is applied a d-c voltage to terminal 31 of sufficient magnitude that there is developed on the gate of $T_{35}$ a voltage sufficient to drive $T_{35}$ to saturation. The voltage applied to the gate of $T_{35}$ will have been compensated for any chip-to-chip variations in threshold voltages by the compensating circuit whereby the drain or output current of $T_{35}$ will be well regulated.

It should be apparent that the principles of the invention have wide application and are not limited to the specific embodiments described. In particular, it should now be evident that the combination of main and load transistors each with its set of control bias transistors provides considerable flexibility permitting a wide range of compensation.

What is claimed is:

1. A circuit comprising
a first terminal to which an input voltage to be compensated is to be applied,
a second terminal at which a compensated voltage is to be derived,
a third terminal which is to be maintained at a reference potential,
a main transistor having its source and drain connected between the second and first terminals, respectively,
a load transistor having its source and drain connected between the third and second terminals, respectively, and
at least one control bias transistor, said control bias transistor having its source connected to the gate of the main transistor and its drain connected to the first terminal.

2. A circuit in accordance with claim 1 characterized in that it includes a second control bias transistor, the first bias control transistor having its source connected to the gate of the main transistor and its drain to the first terminal, and the second bias control transistor having its source connected to the gate of the load transistor and its drain connected to the second terminal.

3. A circuit in accordance with claim 1 further characterized in that it includes a second bias control transistor having its source connected to the gate of the first bias control transistor and its gate and drain connected to the drain of the first bias control transistor.

4. A circuit comprising
a first terminal to which an input voltage is to be applied,
a second terminal to be maintained at a reference potential,
a control node,
a third terminal at which a current is to be derived,
a first transistor having its drain and gate connected to the first terminal and its source to the control node,
a second transistor having its gate and drain connected to the control node,
a third transistor having its gate connected to the source of the second transistor and its drain to the control node,
a fourth transistor having its gate connected to the source of the third transistor, its drain to the control node and its source to the second terminal, and
a fifth transistor having its gate connected to the control node, its source to a point to be maintained at reference potential, and its drain to the third terminal.

5. A monolithic circuit comprising
a first terminal to which an input voltage is to be applied,
a second terminal to be maintained at a reference potential,
a third terminal at which an output is to be derived,
first, second, third, and fourth transistors,
the first transistor having its source connected to the third terminal, its drain connected to the first terminal, and its gate connected to the source of the second transistor,
the second transistor additionally having its drain connected to the first terminal and its gate connected to the source of the third transistor,
the third transistor additionally having its gate and drain connected to the first terminal, and
the fourth transistor having its source connected to the second terminal and its gate and drain connected to the third terminal.

6. A circuit comprising
a first terminal to which an input voltage is to be applied for compensation,
a second terminal at which a compensated voltage may be derived,
first and second transistors, the first having its drain and gate connected to the first terminal and its source connected to the gate of the second transistor, the second transistor having its drain connected to the first terminal and its source to the second terminal,
and circuit means for delivering current to said second terminal as needed.

7. A circuit in accordance with claim 6 further characterized in that the current delivering means comprises
first and second capacitors, third and fourth terminals, and third and fourth transistors,
the first capacitor having one electrode connected to the second terminal and the other to a point adapted to be a reference potential,
the third transistor having its drain connected to the second terminal, its source to the drain of the fourth transistor and its gate to the third terminal,
the second capacitor having one electrode connected to the drain of the fourth transistor and its other to a point adapted to be at reference potential,
the fourth transistor having its source connected to a point adapted to be at reference potential, and its gate to the fourth terminal.

8. A circuit comprising
a first terminal to which an input voltage to be compensated is to be applied,
a second terminal at which a compensated voltage is to be derived,
a third terminal which is to be maintained at a reference potential,
a main transistor having its source and drain connected between the second and first terminals, respectively,
a load transistor having its source and drain connected between the third and second terminals, respectively, and
at least one control bias transistor, said control bias transistor having its source connected to the gate of the load transistor and its drain to the second terminal.

* * * * *